(12) United States Patent
Laughton et al.

(10) Patent No.: US 9,507,737 B2
(45) Date of Patent: Nov. 29, 2016

(54) ARBITRATION CIRCUITRY AND METHOD

(71) Applicants: Arthur Laughton, Cambridge (GB); Andrew David Tune, Cambridge (GB)

(72) Inventors: Arthur Laughton, Cambridge (GB); Andrew David Tune, Cambridge (GB)

(73) Assignee: ARM Limited, Cambridge (GB)

( * ) Notice: Subject to any disclaimer, the term of this patent is extended or adjusted under 35 U.S.C. 154(b) by 1107 days.

(21) Appl. No.: 13/622,427

(22) Filed: Sep. 19, 2012

(65) Prior Publication Data

US 2014/0082239 A1   Mar. 20, 2014

(51) Int. Cl.
    *G06F 13/14*   (2006.01)
    *G06F 13/00*   (2006.01)
    *G06F 13/36*   (2006.01)

(52) U.S. Cl.
    CPC .............. *G06F 13/14* (2013.01); *G06F 13/36* (2013.01); *G06F 2213/0038* (2013.01)

(58) Field of Classification Search
    CPC ....... G06F 13/14; G06F 13/366; G06F 13/00
    USPC .................................................. 710/241–243
    See application file for complete search history.

(56) References Cited

U.S. PATENT DOCUMENTS

| 6,092,137 | A  | * | 7/2000  | Huang et al. ............... 710/111 |
| 6,704,821 | B2 | * | 3/2004  | Scandurra et al. .......... 710/243 |
| 6,880,028 | B2 | * | 4/2005  | Kurth ........................... 710/240 |
| 7,350,003 | B2 | * | 3/2008  | Gish et al. ................... 710/241 |
| 7,506,091 | B2 | * | 3/2009  | Kershaw et al. ............ 710/266 |
| 8,667,197 | B2 | * | 3/2014  | Lai ............................... 710/113 |
| 8,667,200 | B1 | * | 3/2014  | Muliadi et al. ............... 710/241 |
| 2007/0143515 | A1 | * | 6/2007 | Kershaw et al. ............ 710/264 |
| 2009/0138683 | A1 | * | 5/2009 | Capps et al. ................. 712/220 |
| 2011/0208887 | A1 | * | 8/2011 | Chen et al. .................... 710/241 |
| 2013/0318270 | A1 | * | 11/2013 | Tune ............................. 710/244 |
| 2014/0019655 | A1 | * | 1/2014 | Jeloka et al. ................. 710/116 |

OTHER PUBLICATIONS

Nagendra et al., "Area-Time-Power Tradeoffs in Parallel Adders", *IEEE Transactions on Circuits and Systems*, vol. 43, No. 10, Oct. 1996, pp. 689-702.

Zimmerman, "Binary Adder Architectures for Cell-Based VLSI and their Synthesis", —Dissertation Submitted to the Swiss Federal Institute of Technology Zurich, 1997, 110 pgs.

* cited by examiner

*Primary Examiner* — Henry Tsai
*Assistant Examiner* — Christopher A Daley
(74) *Attorney, Agent, or Firm* — Nixon & Vanderhye P.C.

(57) ABSTRACT

Arbitration circuitry is provided to select an output from between multiple inputs each having an associated priority value. A tie-break value is appended to the least significant bits of each of the priority values to form extended priority values before those extended priority values are compared. Thus, if two priority values are equal, then the appended tie-break bits are used to determine which of the two inputs will be selected as having the higher priority.

21 Claims, 5 Drawing Sheets

FIG. 1

(Prior Art)

ARBITRATION CIRCUITRY AND METHOD

BACKGROUND

This invention relates to the field of data processing systems. More particularly, this invention relates to the arbitration between input signals in order to select an output signal.

It is known to provide data processing systems in which it is necessary to arbitrate between multiple input signals in order to select an output signal. As an example, within a system-on-chip integrated circuit such as that illustrated in FIG. 1 of the accompanying drawings, there may be provided multiple transaction masters 2, 4 connected via interconnect circuitry 6 to multiple transaction slaves 8, 10, 12, 14. Each of the transaction masters 2, 4, may generate one or more transactions which are routed via the interconnect circuitry 6 to a target transaction slave 8, 10, 12, 14. Each of these transactions may have a priority value (e.g. representing a quality of service required for that transaction) associated with it and which may be used to control any arbitration that is necessary. A given transaction master 2, 4 may generate more than one stream of transactions. These transactions may have different priority values associated with them.

Figure 1:
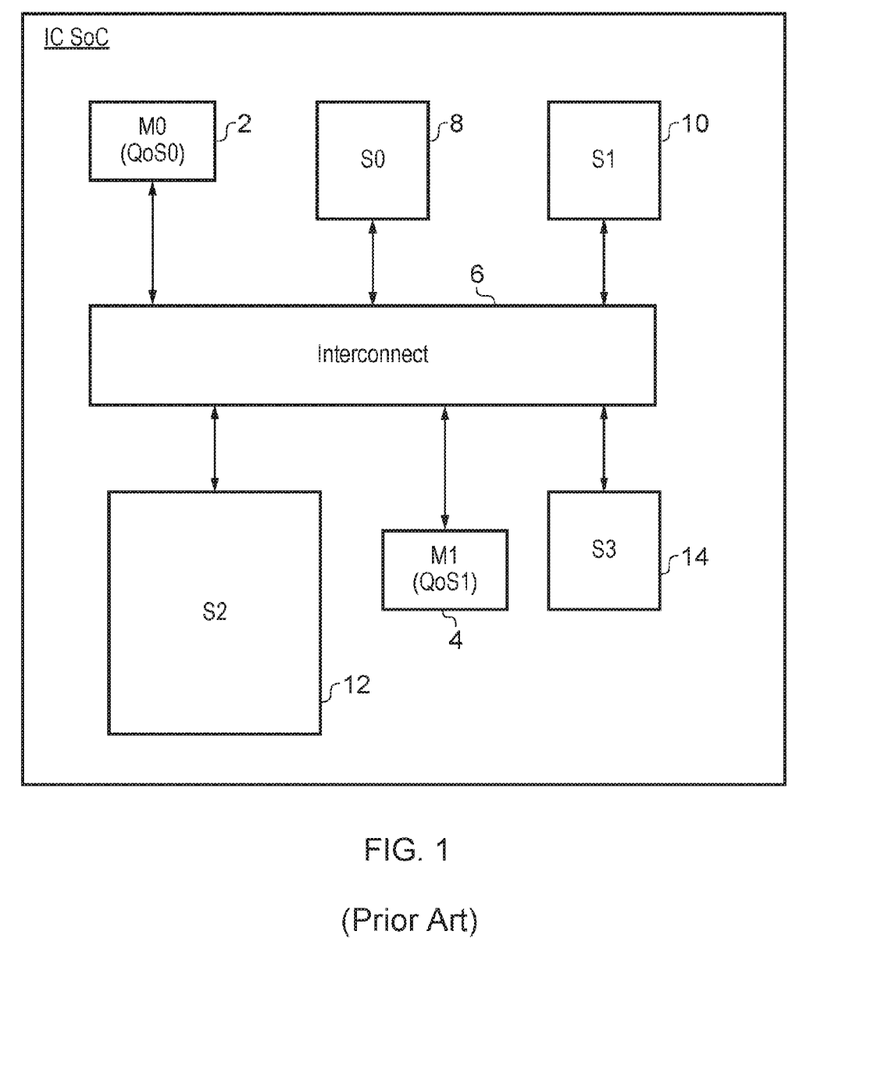
FIG. 1 schematically illustrates an integrated circuit system-on-chip incorporating multiple transaction masters communicating via interconnect circuitry with multiple transaction slaves.

If a plurality of transactions are directed toward a given transaction slave 8, 10, 12, 14, then a bottleneck can arise in which multiple transactions will seek to pass through the same resources within the interconnect circuitry 6 at the same time to reach the desired transaction slave 8, 10, 12, 14. In these circumstances, it is necessary to arbitrate between the conflicting transactions (which represent a plurality of inputs) in order to select which of the transactions is to be passed onward to the target slave 8, 10, 12, 14 (i.e. which should be selected as the output). The priority values associated with each of the transactions (inputs) may be compared and the transaction with the highest priority as indicated by its priority value may be selected to be passed onward at that time. The remaining transactions may be buffered and passed later.

A problem that arises in such systems is that the comparison of the priority values necessary to perform arbitration may constrain the maximum speed at which transactions may be passed through the interconnect circuitry 6. The comparison to perform arbitration may effectively become the critical path at the point at which the arbitration is required. This problem becomes worse when mechanisms are added to deal with tie-break situations in which multiple inputs have priority values indicating the same level of priority. When such tie-break situations arise, it is important that they are dealt with a controlled manner so that a given input is not starved of the ability to be selected as the output. As inputs of the same level of priority clash, it is important that the tie break mechanisms should be "fair" in how they select the output such that each input is selected sufficiently frequently not to result in erroneous behaviour, e.g. one input is starved.

While tie-break mechanisms are important as described above, a problem arises in that they can add additional level of comparison that needs to be performed and accordingly can further constrain the maximum throughput. A comparison of the priority values which accompany an input, which is then followed by a mechanism to deal with any tie-break that is needed can extend the critical path and slow down the processing to an undesirable degree.

SUMMARY

Viewed from one aspect the present invention provides arbitration circuitry for arbitrating between N inputs each having an associated priority value to select an output, where N is an integer value of two or more, said arbitration circuitry comprising:

tie-break value generating circuitry configured to generate a tie-break value;

priority value modifying circuitry configured to extend respective priority values of two or more inputs by appending respective one or more tie-break bits as one or more least significant bits to said priority values to form two or more extended priority values, said one or more tie-break bits forming said one or more least significant bits of at least one of said extended priority values being dependent upon said tie-break value; and comparator circuitry configured to compare said extended priority values of said two or more inputs to select whichever of said two or more inputs has a highest priority such that, if respective priority values within extended priority values of any pair of inputs are the same, then a selection between said pair is made in dependence upon said respective one or more tie-break bits within said extended priority values.

The present technique by appending one or more tie-break bits as least significant bits to the existing priority values associated with the inputs permits both arbitration between the existing priority values and the required tie-break to be performed by the action of one comparison. If the priority values are the same, then the one or more tie-break bits in the least significant bit positions can be used to distinguish between the inputs and permit one to be selected. If the priority values for the inputs are different, then the tie-break bits associated with the least significant bit positions will have no effect. Completing both the normal arbitration via the priority values and any required tie-break in a single comparison speeds up the overall operation and helps to reduce any problems due to a lengthened critical path in selecting which of a plurality of inputs is to be used as the output.

In some embodiments the tie-break value generating circuitry may be configured to change the tie-break to a different tie-break value within a sequence of tie-break values whenever a predetermined condition is met. Cycling the tie-break value around a sequence in this way permits the tie-break bits added to different inputs to be varied in a way that helps assist fairness in the arbitration between inputs having the same priority value.

The tie-break generating circuitry may conveniently be formed to generate an M-bit tie-break value, where M is a lowest integer value satisfying a condition $M \geq \log_2 N$. This provides a tie-break value of a length sufficient to arbitrate a tie-break between N inputs if each of them has the same priority value.

An advantageously compact and quick form of the comparison circuitry is one comprising a plurality of comparator circuits connected in accordance with a binary tree having a root node and M levels, each said comparator circuit corresponding to a node within said binary tree and configured to select one of two inputs in accordance with an arbitration operation such that said root node generates an arbitration result identifying said output; wherein each said comparator circuit within a given level of said binary tree is configured to compare respective extended priority values of a pair of said inputs to select whichever of said pair has a higher priority.

A binary tree implementation of the comparator is both compact and rapid in operation making it well suited to the comparison of priority values and their associated tie-break bits that is desired for high speed arbitration.

In the context of a comparator having the binary tree form, in some embodiments the one or more tie-break bits comprise an Xth bit of an M-bit tie-break value with the value of X being constant within each level of the binary tree and differing between each level of the binary tree. This provides a compact and efficient implementation.

In some embodiments the Xth bit may be appended as a least significant bit to a first one of the priority values with a fixed bit being appended as a least significant bit of a second one of the priority values. The comparison circuitry may then compare the first extended priority value to the second extended priority value to determine which of the pair has higher priority. If there is a tie, then a default selection between the two values may be made.

In other embodiments, the Xth bit may be appended as a least significant bit to one of the priority values with a complement of this value being appended as the least significant bit of another of the priority values. A comparison can then be made between the two extended priority values to determine which has the higher priority.

In both of the above circumstances, it will be appreciated that the tie-break bit appended to the priority values will only have a significance in which of the extended priority values is determined to have the higher priority if the priority values which used to form the respective extended priority values have the same value. In this case, the final tie-break bit will be significant in determining the difference between the two extended priority values as to which has higher priority.

In some embodiments the value of X may change monotonically when traversing between levels within the binary tree such that different levels within the binary tree use as a tie-break bit a different one of the bits of the tie-break value. In some embodiments, the route node of the binary tree may use the least significant bit of the N-bit tie-break value.

It will be appreciated that the arbitration circuitry in accordance with the present technique could be used in a wide variety of different situations. One situation in which the arbitration circuitry is particularly useful is when the priority values indicate a quality of service associated with data transactions flowing within interconnect circuitry of an integrated circuit. Such transactions require rapid starvation-free arbitration to be performed in order to maintain data throughput and system performance.

As previously mentioned, the tie-break value may be generated such that it changes in accordance with a sequence of tie-break values whenever a predetermined condition is met. The predetermined condition may take a variety of different forms. In some embodiments, the predetermined condition may be that the arbitration circuitry has performed an arbitration operation that has selected between inputs. In other embodiments the predetermined condition may be that the comparator has selected between a pair of inputs in a manner which is dependent upon the tie-break value, i.e. the tie-break bits were significant in a selection that was made. In other embodiments the predetermined condition may be that a clock signal supplied to the tie-break value generating circuitry indicates that a predetermined period has passed, e.g. one clock cycle.

Whilst it will be appreciated that the tie-break values could cycle through sequences of many different forms, in some simple embodiments which can yield good starvation-free results and fair arbitration the tie-break value passes along a sequence of incrementing tie-break values or a sequence of decrementing tie-break values.

Viewed from another aspect the present invention provides an arbitration circuitry for arbitrating between N inputs each having an associated priority value to select an output, where N is an integer value of two or more, said arbitration circuitry comprising:

tie-break value generating means for generating a tie-break value;

priority value modifying means for extending respective priority values of two or more inputs by appending respective one or more tie-break bits as one or more least significant bits to said priority values to form two or more extended priority values, said one or more tie-break bits forming said one or more least significant bits of at least one of said extended priority values being dependent upon said tie-break value; and comparator means for comparing said extended priority values of said two or more inputs to select whichever of said two or more inputs has a highest priority such that, if respective priority values within extended priority values of any pair of inputs are the same, then a selection between said pair is made in dependence upon said respective one or more tie-break bits within said extended priority values.

Viewed from a further aspect the present invention provides a method of arbitrating between N inputs each having an associated priority value to select an output, where N is an integer value of two or more, said arbitration circuitry comprising:

generating a tie-break value;

extending respective priority values of two or more inputs by appending respective one or more tie-break bits as one or more least significant bits to said priority values to form two or more extended priority values, said one or more tie-break bits forming said one or more least significant bits of at least one of said extended priority values being dependent upon said tie-break value; and comparing said extended priority values of said two or more inputs to select whichever of said two or more inputs has a highest priority such that, if respective priority values within extended priority values of any pair of inputs are the same, then a selection between said pair is made in dependence upon said respective one or more tie-break bits within said extended priority values.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 2:
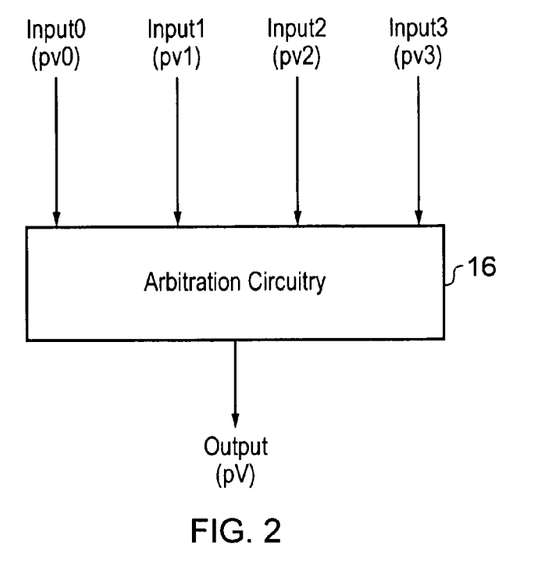
FIG. 2 schematically illustrates arbitration circuitry selecting between multiple inputs to select an output.

FIG. 2 schematically illustrates arbitration circuitry 16 which receives, for example, four inputs each having an associated priority value pv. The arbitration circuitry compares the priority values pv and selects an the output from the arbitration circuitry whichever of the inputs is indicated by the priority values pv has having the highest priority. As previously discussed, if two inputs have priority values which indicate the same level of priority, then a tie-break mechanism is used in order to select which of these inputs will be used as the output.

Figure 3:
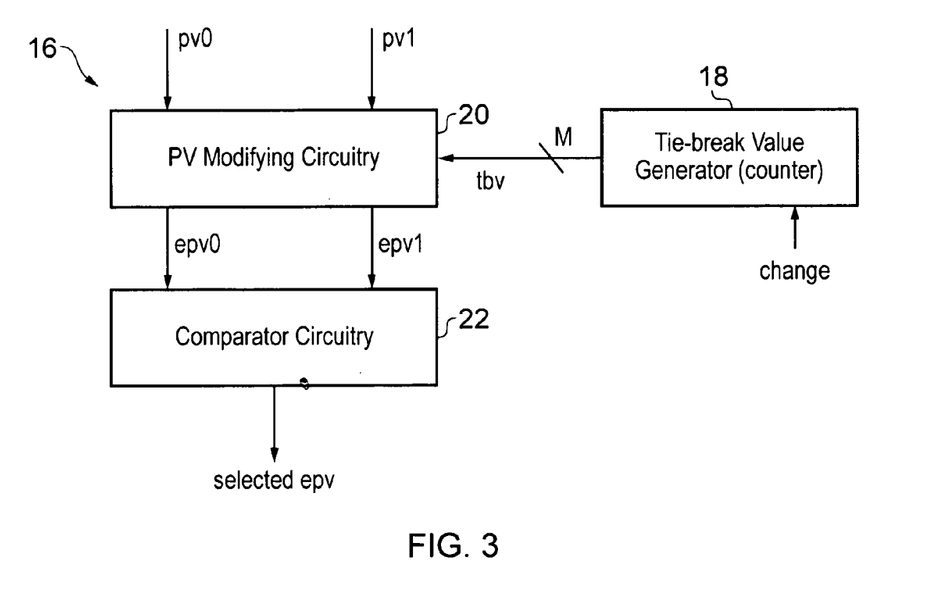
FIG. 3 schematically illustrates a first embodiment of arbitration circuitry which appends a tie-break value to the priority values.

FIG. 3 schematically illustrates the arbitration circuitry 16 including a tie-break mechanism. Tie-break value generating circuitry 18 generates an M-bit tie-break value tbv which is supplied to priority value modifying circuitry 20. If there are N inputs between which a tie-break may need to be resolved, then the tie-break value has M bits, where M is the lowest integer that is greater than or equal to $\log_2 N$. As an example, if there are a maximum of four inputs between which a tie break may need to be resolved, then a two-bit tie-break value is used. If there are six inputs between which a tie-break may need to be resolved, then a three input tie-break value is used.

The priority value modifying circuitry 20 serves to generate extended priority values epv by appending one or more bits of the tie break value tbv to at least one of the received priority values pv. In some embodiments one of the priority values may have the tie-break bits appended to it with the other of the priority values having fixed bits appended to it. In other embodiments, one of the priority values may have the tie-break bits appended to it with the other of the priority values having the complement of the tie-break values appended to it.

Comparitor circuitry 22 receives the extended priority values epv from the priority value modifying circuitry 20 and compares the extended priority values epv0, epv1 in order to select which of the inputs will be treated as having the highest priority and form the selected output.

Figure 4:
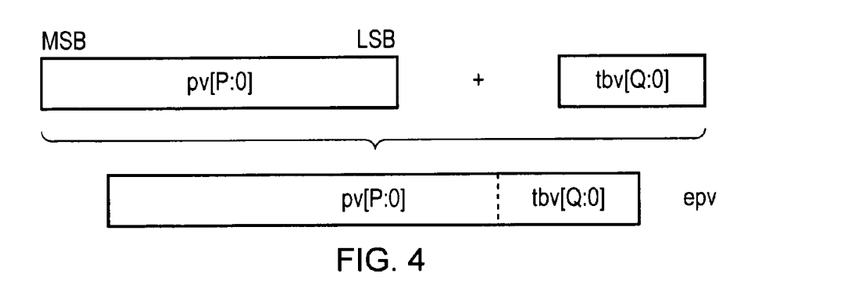
FIG. 4 schematically illustrates the forms of a priority value, tie-break bits and an extended priority value.

FIG. 4 schematically illustrates the formation of an extended priority value epv from an input priority value and one or more tie-break bits of a tie-break value tbv. In the example illustrated, P+1 bits of the priority value pv have appended to their least significant bit end Q+1 bits of a tie-break value tbv. This forms an extended priority value with a bit length of P+Q+2. It will be appreciated that in many circumstances, such as the binary tree implementations discussed below, where only two priority values are compared against each other at any one time, then only a single tie-break bit needs to be added to the priority values in order to control any tie-break that is necessary. However, more generally, the tie-break value which is appended to the priority value could have a length of more than one bit.

Figure 5:
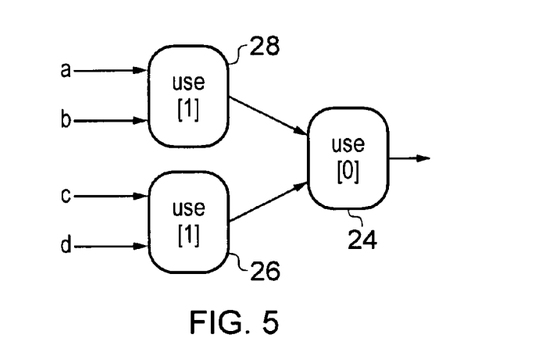
FIG. 5 schematically illustrates a first example of a binary tree comparator.

FIG. 5 schematically illustrates a binary tree comparator. This is formed of a roote comparator 24 and two first level comparitors 26, 28. Each of the comparators 24, 26, 28 compares a pair of priority values, or more precisely a pair of extended priority values. In this example, there are four inputs a, b, c, d which are supplied to the first level within the binary tree. The tie-break value in this example is a two-bit value M[1:0]. The tie-break bit added to the priority values in the first level of the binary tree for use by the comparators 26 and 28 is the bit M[1]. This forms respective extended priority values that are compared in the comparitors 26, 28. If the priority values, for example, of inputs a and b are the same, then the different tie-break bit values that have been appended to those priority values to form respective extended priority values are used to discriminate between the inputs and cause one of the inputs to be selected in preference to the other of the inputs. The tie-break value is then changed as it moved along a sequence of values (such as an incrementing sequence or a decrementing sequence). Accordingly, the relevant bit M[1] of the tie-break value which was appended in the first level for use by the comparators 26, 28 would change in value and a different selection between a pair of inputs having the same priority value would be made at a different time in order to ensure fairness in the selection between inputs having the same priority values. The root node in the binary tree corresponds to a comparator 24 which uses the bit M[0] to extend its received priority values in order to form extended priority values which can deal with a tie-break. The final output is from the comparator 24.

Figure 6:
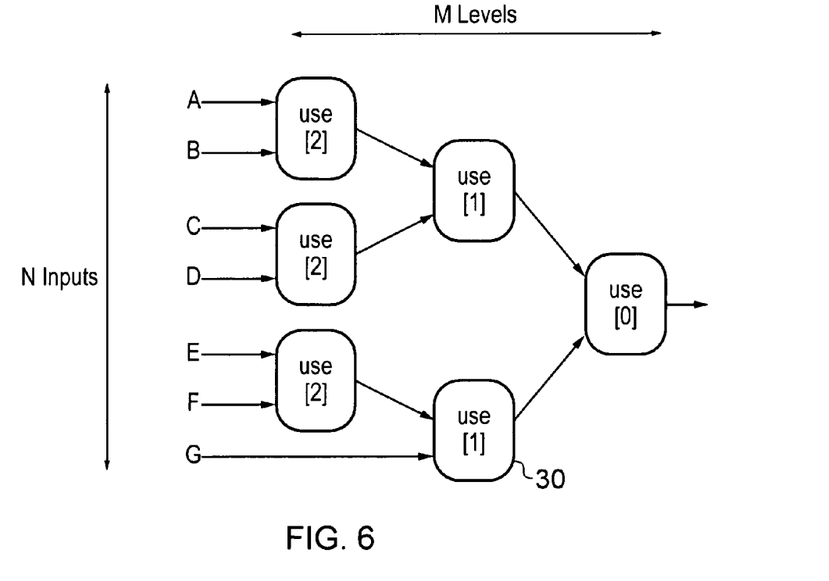
FIG. 6 schematically illustrates a second example of a binary tree comparator.

FIG. 6 schematically illustrates a further example of a binary tree comparator. This example has M levels and serves to compare priority values of N inputs. More specifically, in this case there are seven inputs and this requires use of a three level binary tree comparator. The tie-break value is a 3-bit value. Each level within the binary tree selects for use as the tie-break bit it will append to its priority values a different one of the bits of the M-bit tie-break value. In the example illustrated, the root level uses bit [0], the first level uses bit [1] and the second level uses bit [2]. Thus, the different levels use a monotonically increasing bit position within the M-bit tie-break value as their tie-break bit. In other embodiments, this could be a monotonically decreasing selection or even a selection which was not monotonic, but varied between levels. Within each level the same bit is used.

It will be seen from FIG. 6, that when the number of inputs is not a power of 2, a tie-break bit which is of relevance in performing a tie-break between two different inputs will be the one in use at the point in which those two different inputs meet within the binary tree. For example, if inputs F and G of FIG. 6 have the same priority value, then it would be comparator 30 which would select between them and comparator 30 uses bit [1] of the 3-bit tie-break value to form its extended priority value which would be compared to make this selection.

Figure 7:
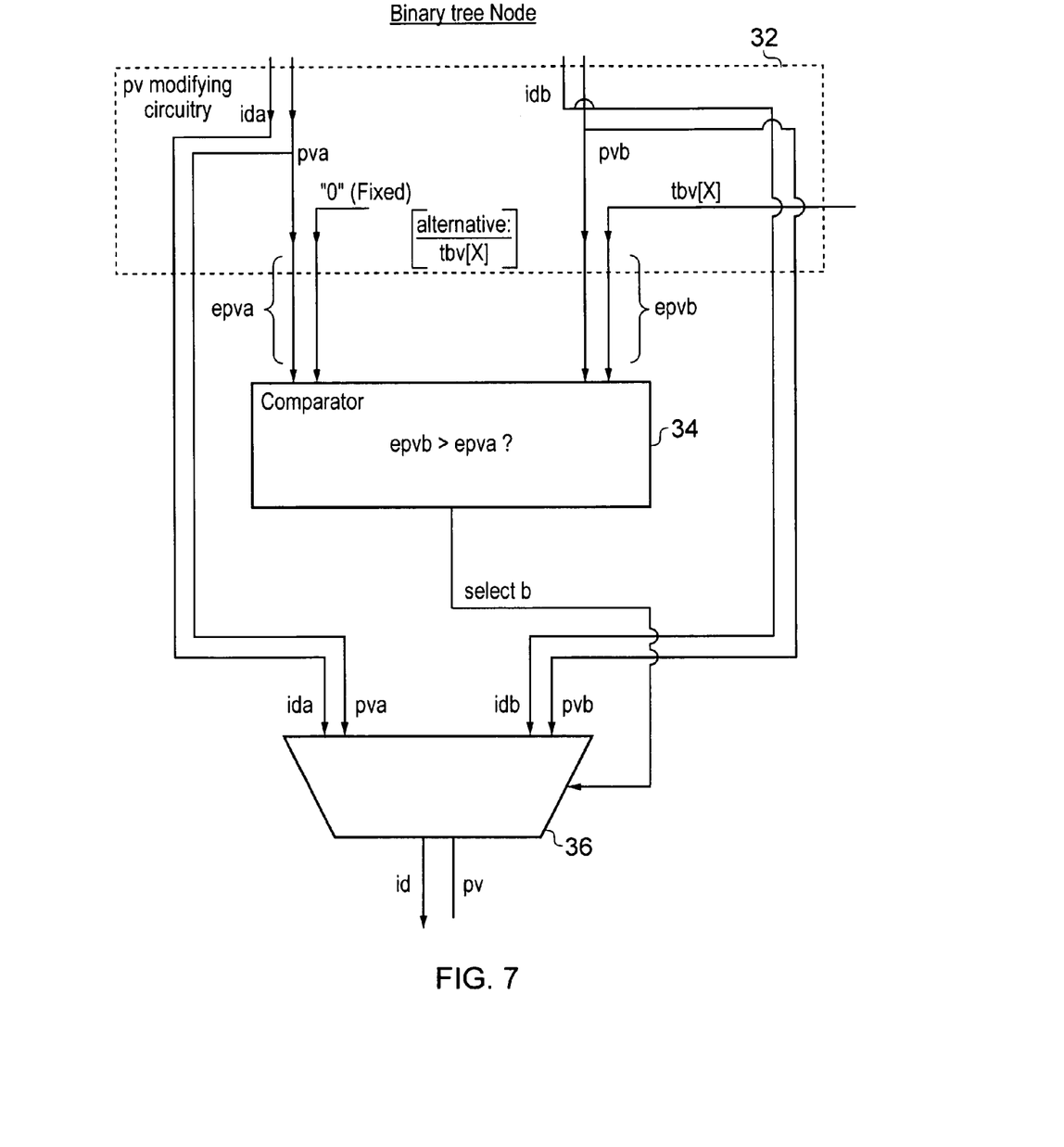
FIG. 7 schematically illustrates a node within a binary tree comparator.

FIG. 7 schematically illustrates one of the binary tree nodes of FIGS. 5 and 6 in more detail. As shown, the priority values pva, pvb associated with inputs a, b are received by priority value modifying circuitry 32. In this example an Xth bit of the tie-break value tbv is appended as a least significant bit to the priority value pvb to form an extended priority value epvb. The priority value for the other input pva has a fixed bit value "0" appended to it to form the extended priority value epva. As an alternative to appending this fixed bit, in other embodiments the complement of the bit tbv[X] could be added to the priority value pva.

A two-input comparator 34 determines whether the extended priority value epvb is greater than the extended priority value epva. If this condition is true, then the select b output from the comparator 34 is asserted true. If this condition determined by comparator 34 is false, then the select b signal is asserted false.

A multiplexer 36 is controlled by the select b signal to select the b channel if the select b signal is true and to select the a channel if the select b signal is false. The output from the multiplexer 36 is the priority value of the input which has been determined to have the highest priority. This is selected priority value accompanied by a signal identifying which of the inputs was associated with that priority value.

The output of the comparator of the root node of the binary tree is a priority value of the highest input among the original N inputs together with an identifier of that input. The identifier of that input may then be used, for example, to select the appropriate transaction to be passed on further within the system.

Figure 8:
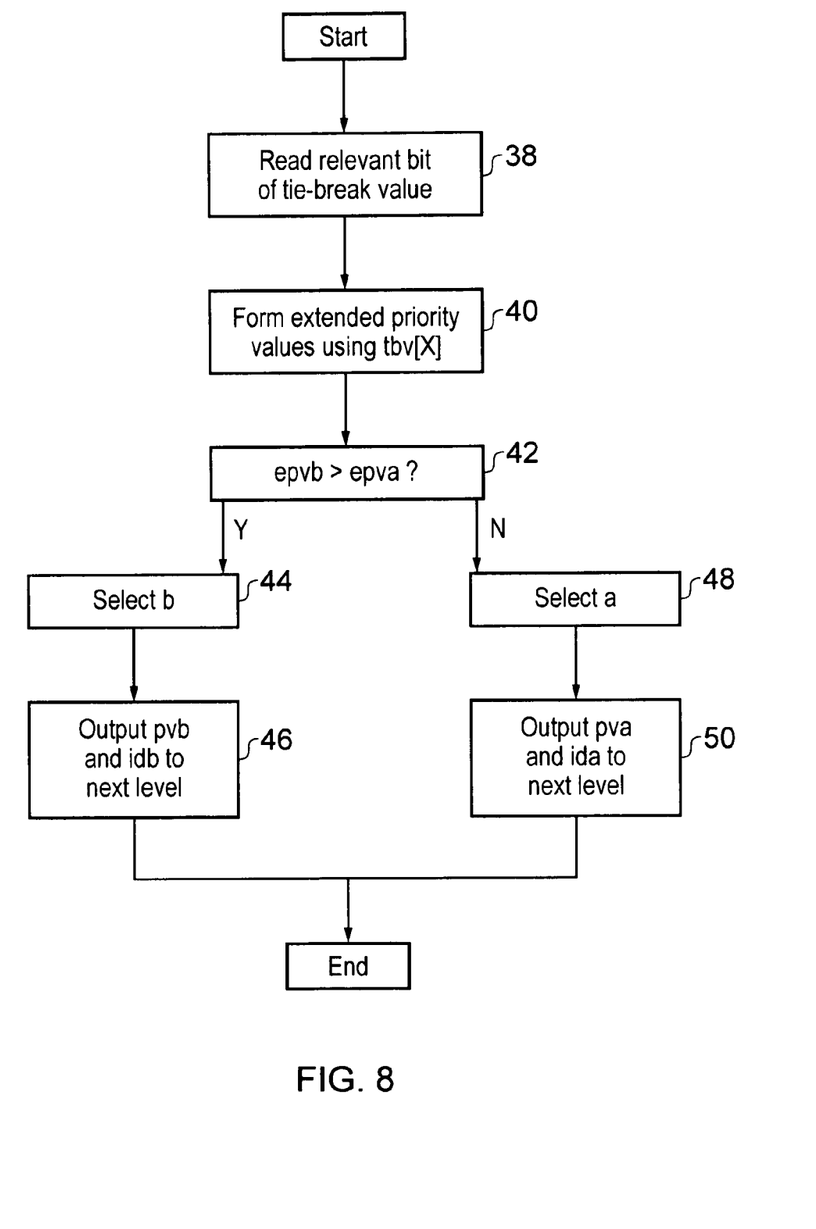
FIG. 8 is a flow diagram schematically illustrating the operation of the node of FIG. 7.

FIG. 8 is a flow diagram schematically illustrating the operation of the binary tree node of FIG. 7. At step 38 the Xth bit of the tie break value tbv is read. At step 40 the extended priority values epva and epvb are formed. At step 42 a comparison is made between epvb and epva to determine if epvb is greater than epva. If epvb is greater, then step 44 selects b as the input to be passed and step 46 outputs pvb and the identifier for the b channel (namely idb) to the next level within the binary tree. Conversely, if the determination at step 42 was that epvb was not greater than epva (i.e. a tie in the case of a single bit), then step 48 serves to select input a to be passed on by that node and step 50 outputs the priority value epva together with the identifier ida from that node.

Returning to FIG. 3, it will be noted that the tie-break value generator 18 is illustrated as being formed as a counter. As previously mentioned, this may an incrementing counter or a decrementing counter. A change signal input to the tie-break value generator serves to trigger this to change the value of the tie-break value following a sequence of tie-break values. The change signal is asserted whenever a predetermined condition is met. This predetermined condition may have a variety of forms. In one simple form it may be the rising edge of a clock signal such that the predetermined event is an indication that a predetermined time period has passed. Another predetermined condition which may trigger the change signal to be asserted is that the arbitration circuitry 16 has performed an arbitration. Thus, the tie break value is changed each time an arbitration is performed such that different extended priority values will be formed and will result in changed selections should a tie-break operation be needed between inputs that share the same priority value. In other embodiments, the predetermined condition may be that the comparator circuits have selected between a pair of inputs in dependence upon the tie-break value. Thus, each time the tie-break value is used to break a tie between priority values, then the tie-break value is changed. This ensures that the same tie-break value will not be used to control the arbitration circuitry on successive tie-break operations.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Arbitration circuitry for arbitrating between N inputs each having an associated priority value to select an output, where N is an integer value of two or more, said arbitration circuitry comprising:
   tie-break value generating circuitry configured to generate an M-bit tie-break value, where M is a lowest integer value satisfying a condition $M \geq \log_2 N$;
   priority value modifying circuitry configured to extend respective priority values of two or more inputs by appending respective one or more tie-break bits as one or more least significant bits to said priority values to form two or more extended priority values, said one or more tie-break bits forming said one or more least significant bits of at least one of said extended priority values being dependent upon said tie-break value; and
   comparator circuitry configured to compare said extended priority values of said two or more inputs to select whichever of said two or more inputs has a highest priority such that, if respective priority values within extended priority values of any pair of inputs are the same, then a selection between said pair is made in dependence upon said respective one or more tie-break bits within said extended priority values, the comparator circuitry including a plurality of comparator circuits connected in accordance a binary tree having a root node and M levels, each comparator circuit corresponding to a node within said binary tree and configured to select one of two inputs in accordance with an arbitration operation such that said root node generates an arbitration result identifying said output,
   wherein each said comparator circuit within a level of said binary tree is configured to compare respective extended priority values of a pair of said inputs to select whichever of said pair has a higher priority, and
   wherein said one or more tie-break bits include an Xth bit of said M-bit tie-break value and the value of X is constant within each level of said binary tree and differs between each level of said binary tree.

2. Arbitration circuitry as claimed in claim 1, wherein said tie-break value generating circuitry is configured to change said tie-break value to a different tie-break value within a sequence of tie-break values whenever a predetermined condition is met.

3. Arbitration circuitry as claimed in claim 2, wherein said predetermined condition is one of:
   said arbitration circuitry has performed an arbitration between said N inputs to select said output;
   said comparator circuits has selected between a pair of inputs in dependence upon said tie-break value; and
   a clock signal supplied to said tie-break value generating circuit has indicated a predetermined time period has passed.

4. Arbitration circuitry as claimed in claim 2, wherein said sequence of tie-break values comprises one of:
   a sequence of incrementing tie-break values; and
   a sequence of decrementing tie-break values.

5. Arbitration circuitry as claimed in claim 1, wherein each said comparator circuit is configured:
   to append said Xth bit as a least significant bit to a first one of said priority values of said pair to form a first extended priority value;
   to append a bit having a fixed value as a least significant bit to a second one of said priority values of said pair to form a second extended priority value; and
   to compare said first extended priority value to said second extended priority value to determine which of said pair has a higher priority.

6. Arbitration circuitry as claimed in claim 1, wherein each said comparator circuit is configured:
   to append said Xth bit as a least significant bit to a first one of said priority values of said pair to form a first extended priority value;
   to append a complement of said Xth bit as a least significant bit to a second one of said priority values of said pair to form a second extended priority value; and
   to compare said first extended priority value to said second extended priority value to determine which of said pair has a higher priority.

7. Arbitration circuitry as claimed in claim 1, wherein said value of X changes monotonically when traversing between levels of said binary tree.

8. Arbitration circuitry as claimed in claim 7, wherein a least significant bit of said M-bit state value serves as said Xth bit for said root node.

9. Arbitration circuitry as claimed in claim 1, wherein said N inputs correspond to N different data transactions flowing within interconnect circuitry of an integrated circuit.

10. Arbitration circuitry as claimed in claim 9, wherein said priority values indicate respective quality of service values associated with said N different data transactions.

11. Arbitration circuitry for arbitrating between N inputs each having an associated priority value to select an output, where N is an integer value of two or more, said arbitration circuitry comprising:
    tie-break value generating means for generating an M-bit tie-break value, where M is a lowest integer value satisfying a condition M≥log$_2$N;
    priority value modifying means for extending respective priority values of two or more inputs by appending respective one or more tie-break bits as one or more least significant bits to said priority values to form two or more extended priority values, said one or more tie-break bits forming said one or more least significant bits of at least one of said extended priority values being dependent upon said tie-break value; and
    comparator means for comparing said extended priority values of said two or more inputs to select whichever of said two or more inputs has a highest priority such that, if respective priority values within extended priority values of any pair of inputs are the same, then a selection between said pair is made in dependence upon said respective one or more tie-break bits within said extended priority values, the comparator means including a plurality of comparator circuits connected in accordance a binary tree having a root node and M levels, each comparator circuit corresponding to a node within said binary tree and configured to select one of two inputs in accordance with an arbitration operation such that said root node generates an arbitration result identifying said output,
    wherein each said comparator circuit within a level of said binary tree is configured to compare respective extended priority values of a pair of said inputs to select whichever of said pair has a higher priority, and
    wherein said one or more tie-break bits include an Xth bit of said M-bit tie-break value and the value of X is constant within each level of said binary tree and differs between each level of said binary tree.

12. A method of arbitrating between N inputs each having an associated priority value to select an output, where N is an integer value of two or more, said arbitration circuitry comprising:
    generating an M-bit tie-break value, where M is a lowest integer value satisfying a condition M≥log$_2$N;
    extending respective priority values of two or more inputs by appending respective one or more tie-break bits as one or more least significant bits to said priority values to form two or more extended priority values, said one or more tie-break bits forming said one or more least significant bits of at least one of said extended priority values being dependent upon said tie-break value;
    comparing said extended priority values of said two or more inputs to select whichever of said two or more inputs has a highest priority such that, if respective priority values within extended priority values of any pair of inputs are the same, then a selection between said pair is made in dependence upon said respective one or more tie-break bits within said extended priority values;
    providing a plurality of comparator circuits connected in accordance a binary tree having a root node and M levels;
    selecting with each comparator circuit corresponding to a node within said binary tree one of two inputs in accordance with an arbitration operation such that said root node generates an arbitration result identifying said output; and
    each said comparator circuit within a level of said binary tree comparing respective extended priority values of a pair of said inputs to select whichever of said pair has a higher priority,
    wherein said one or more tie-break bits include an Xth bit of said M-bit tie-break value and the value of X is constant within each level of said binary tree and differs between each level of said binary tree.

13. A method as claimed in claim 12, comprising the step of changing said tie-break value to a different tie-break value within a sequence of tie-break values whenever a predetermined condition is met.

14. A method as claimed in claim 13, wherein said predetermined condition is one of:
    an arbitration between said N inputs to select said output has been performed;
    said steps of comparing has selected between a pair of inputs in dependence upon said tie-break value; and
    a clock signal supplied to said state value generating circuit has indicated a predetermined time period has passed.

15. A method as claimed in claim 13, wherein said sequence of tie-break values comprises one of:
    a sequence of incrementing tie-break values; and
    a sequence of decrementing tie-break values.

16. A method as claimed in claim 12, comprising the steps of:
    appending said Xth bit as a least significant bit to a first one of said priority values of said pair to form a first extended priority value;
    appending a bit having a fixed value as a least significant bit to a second one of said priority values of said pair to form a second extended priority value; and
    comparing said first extended priority value to said second extended priority value to determine which of said pair has a higher priority.

17. A method as claimed in claim 12, comprising the steps of:
    appending said Xth bit as a least significant bit to a first one of said priority values of said pair to form a first extended priority value;
    appending a complement of said Xth bit as a least significant bit to a second one of said priority values of said pair to form a second extended priority value; and
    comparing said first extended priority value to said second extended priority value to determine which of said pair has a higher priority.

18. A method as claimed in claim 12, wherein said value of X changes monotonically when traversing between levels of said binary tree.

19. A method as claimed in claim 18, wherein a least significant bit of said M-bit state value serves as said Xth bit for said root node.

20. A method as claimed in claim 12, wherein said N inputs correspond to N different data transactions flowing within interconnect circuitry of an integrated circuit.

21. A method as claimed in claim 20, wherein said priority values indicate respective quality of service values associated with said N different data transactions.

\* \* \* \* \*